US009667562B2

(12) United States Patent
Polk et al.

(10) Patent No.: US 9,667,562 B2
(45) Date of Patent: May 30, 2017

(54) METHOD AND APPARATUS FOR SUPPORTING VARIABLE BIT-RATE RESERVATIONS

(75) Inventors: James M. Polk, Colleyville, TX (US); Paul E. Jones, Apex, NC (US); Subhasri Dhesikan, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 860 days.

(21) Appl. No.: 13/558,596

(22) Filed: Jul. 26, 2012

(65) Prior Publication Data

US 2014/0029629 A1    Jan. 30, 2014

(51) Int. Cl.
*H04L 12/913* (2013.01)
*H04L 12/911* (2013.01)
*H04L 12/801* (2013.01)

(52) U.S. Cl.
CPC ............ *H04L 47/724* (2013.01); *H04L 47/10* (2013.01); *H04L 47/12* (2013.01); *H04L 47/822* (2013.01)

(58) Field of Classification Search
CPC ..... H04W 84/12; H04W 27/24; H04W 24/00; H04L 47/724; H04L 47/822; H04L 47/10; H04L 47/12
USPC .................................. 370/229, 329, 348, 468
See application file for complete search history.

(56) References Cited

U.S. PATENT DOCUMENTS

| | | | |
|---|---|---|---|
| 6,621,805 B1 | 9/2003 | Kondylis et al. | |
| 7,532,613 B1* | 5/2009 | Sen et al. | 370/352 |
| 7,573,887 B2 | 8/2009 | Chen et al. | |
| 7,907,519 B2* | 3/2011 | Songhurst et al. | 370/229 |
| 8,254,412 B2 | 8/2012 | Le Faucheur et al. | |
| 8,619,564 B2 | 12/2013 | Polk et al. | |
| 2004/0252714 A1* | 12/2004 | Oh et al. | 370/437 |
| 2005/0030951 A1* | 2/2005 | Maciocco et al. | 370/395.2 |
| 2007/0206607 A1 | 9/2007 | Chapman et al. | |
| 2008/0080473 A1* | 4/2008 | Thubert et al. | 370/348 |
| 2011/0039554 A1* | 2/2011 | Bims | 455/434 |

(Continued)

OTHER PUBLICATIONS

Polk et al; A Resource Reservation Protocol (RSVP) Extension for the Reduction of Bandwidth of a Reservation Flow; Network Working Group, May 2006; tools.ietf.org/pdf/rfc4495.

(Continued)

*Primary Examiner* — Alpus H Hsu
*Assistant Examiner* — Anthony Luo
(74) *Attorney, Agent, or Firm* — P. Su

(57) ABSTRACT

In one embodiment, a method includes obtaining a first message from an application associated with a variable bit-rate (VBR) media flow, the first message including information that has at least an approximately minimum bandwidth at which the VBR media flow may operate and an amount by which a bandwidth of the VBR media flow may be trimmed. The method also includes determining an amount of available bandwidth in a network, and identifying the approximately minimum bandwidth at which the VBR media flow may operate and the amount by which the bandwidth of the VBR media flow may be trimmed. Finally, the method includes identifying a bandwidth allocation identified based on the amount of available bandwidth in the network, the approximately minimum bandwidth at which the VBR media flow may operate, and the amount by which the bandwidth of the VBR media flow may be trimmed.

22 Claims, 8 Drawing Sheets

(56) References Cited

U.S. PATENT DOCUMENTS

2011/0044258 A1* 2/2011 Nezou .......................... 370/329
2012/0226816 A1* 9/2012 Leung et al. ................. 709/228

OTHER PUBLICATIONS

J. Wroclawski; The Use of RSVP with IETF Integrated Services; Network Working Group, Sep. 1997; tools.ietf.org/pdf/rfc2210.pdf.
Polk et al.; Integrated Services Extension to Allow Signaling of Multiple Traffic Specifications and Multiple Flow Specifications in RSVPv1; TSVWG WG, Mar. 14, 2011.

* cited by examiner

METHOD AND APPARATUS FOR SUPPORTING VARIABLE BIT-RATE RESERVATIONS

TECHNICAL FIELD

This disclosure relates generally to communications systems. More particularly, this disclosure relates to the efficient allocation of bandwidth to effectively ensure robust delivery of voice, video, and presentation data without wasting significant bandwidth.

BACKGROUND

The Resource Reservation Protocol (RSVP) is a transport layer protocol which allows resources to be reserved across a network. The resources are generally reserved for a flow. Typically, a sender of a request will send an RSVP PATH message downstream to a receiver. The receiver will send an RSVP reservation request (RESV) message upstream to the sender of the request in response to the PATH message. Some hops in a path between the receiver and the sender is arranged to create and maintain a reservation state that is associated with the resources reserved for data packets which are to be sent from the sender.

Typically, a RESV message specifies a bandwidth request which effectively indicates the amount of resources to be reserved for a flow. Each hop in a path associated with a network that receives the RESV message ascertains whether it has sufficient resources to accommodate the bandwidth request. If a hop is able to accommodate the bandwidth request, the hop effectively reserves the appropriate amount of bandwidth for the flow. If the hop is unable to accommodate the bandwidth request, the hop generates an RSVP reservation error (RESVERR) message and sends the RESVERR message to the endpoint that is the source of the RESV message.

When an endpoint that is the source of the RESV message receives the RESVERR message, the endpoint may send a new RESV message which specifies a request for a smaller amount of bandwidth. As will be appreciated by those skilled in the art, some applications are only able to use certain bandwidths which match with the codecs supported by the applications. Hence, a request for a smaller amount of bandwidth is generally a request for a smaller amount of bandwidth which matches the appropriate codecs. In general, multiple RESV messages may be sent by an endpoint in an effort to reserve resources for a flow. The sending and processing of multiple RESV messages may be relatively time consuming and, thus, inefficient.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
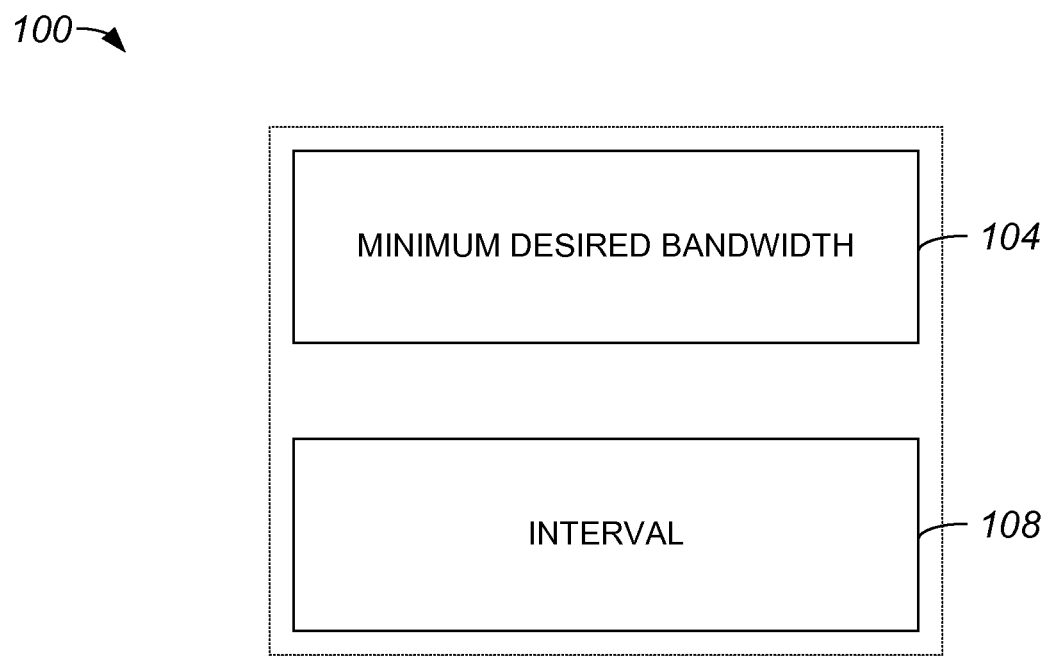
FIG. 1 is a diagrammatic representation of an object or a data structure that provides information relating to a substantially minimum desired bandwidth and an interval that specifies an amount by which bandwidth may be trimmed in accordance with an embodiment.

According to one aspect of the present invention, a method includes obtaining a first message from an application, the application being associated with a variable bit-rate (VBR) media flow such as a VBR codec, the first message including information that has at least an approximately minimum bandwidth at which the VBR media flow may operate, and may optionally include an amount by which a bandwidth of the VBR media flow may be trimmed. The method also includes determining an amount of available bandwidth in a network, and identifying the approximately minimum bandwidth at which the VBR media flow may operate and the amount by which the bandwidth of the VBR media flow may be trimmed. Finally, the method also includes identifying a bandwidth allocation, the bandwidth allocation being identified based on the amount of available bandwidth in the network, the approximately minimum bandwidth at which the VBR media flow may operate, and the amount by which the bandwidth of the VBR media flow may be trimmed.

Description

In some situations, multiple Resource Reservation Protocol (RSVP) reservation (RESV) request messages are sent along a path, or an accumulation of routers, between endpoints before a bandwidth allocation may be reserved with respect to that path for a desired flow. Sending multiple RESV requests messages may often be inefficient.

As will be appreciated by those skilled in the art, RSVP is generally used for establishing a constant bit-rate reservation between two or more endpoints. Generally, RSVP may be used to effectively ensure that a certain bandwidth of traffic has access to network resources between endpoints. When an endpoint transmits more than is allowed within a fixed amount bandwidth reservation, routers may effectively police extra packets as being outside the fixed amount bandwidth reservation. The extra packets are typically either dropped or moved into a best effort or scavenger class towards the appropriate endpoint.

In one embodiment, a bandwidth reservation protocol allows multiple acceptable bandwidths to be specified in conjunction with a bandwidth reservation request in realtime communication applications. Upon obtaining a request that effectively specifies acceptable amounts of bandwidth, a node associated with a network may determine how much bandwidth to allocate to the request based on how much bandwidth is available and the acceptable amounts of bandwidth. Acceptable amounts of bandwidth may be specified in an object or a data structure. For example, a bandwidth ranging object that essentially specifies a range of acceptable bandwidths may be created for use with variable bit-rate codecs, or codecs that may operate at one of several different bit-rates. A variable bit-rate codec is generally configured such that a bit-rate of the codec may be dynamically adapted. Many video applications utilize variable bit-rate codes.

A network may dynamically change, or otherwise adapt, an amount of bandwidth allocated to an application if the network is aware of the bandwidth that an application may use. In one embodiment, when an application specifies a range of acceptable bandwidths, as well as a rate at which bandwidth may be stepped down, a network may efficiently allocate bandwidth to the application. Enabling a network to allocate a substantially maximum amount of available bandwidth to an application which specifies that the application may accept different amounts of bandwidth substantially without requiring multiple roundtrip negotiations generally enables bandwidth to be allocated efficiently. Once a network allocates an amount of bandwidth, the network may communicate with the application, e.g., via RSVP. When the application is using a VBR codec, in one embodiment, the application may adapt the codec to use the allocated bandwidth.

Referring initially to FIG. 1, an object or a data structure that provides information relating to a plurality of acceptable bandwidths will be described in accordance with an embodiment. An object 100 generally includes information elements 104, 108 that support a variable bit-rate media flow, e.g., a variable bit-rate codec. Information element 104 is associated with a parameter that substantially specifies a minimum desired bandwidth. In one embodiment, minimum desired bandwidth 104 is effectively a minimum bandwidth at which an associated media flow such as a codec may operate properly. Information element 108 is associated with a parameter that substantially specifies an interval 108 that is indicative of how much bandwidth a network may trim from an associated codec while still allowing the associated codec to operate. For example, a desired bandwidth for a codec may be a particular value that may be trimmed by interval 108, while still allowing codec to operate properly. A desired bandwidth may be provided in, but is not limited to being provided in, TSPEC associated with a PATH message or in a flowspec associated with a RESV message.

Figure 2A:
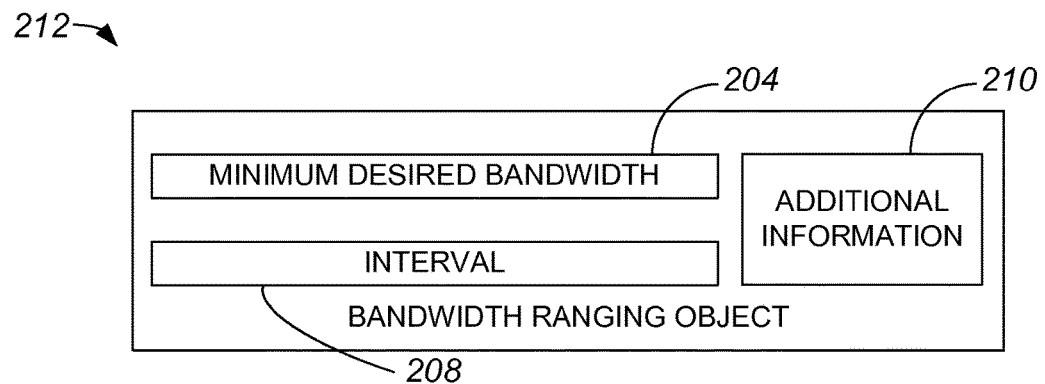
FIG. 2A is a diagrammatic representation of a bandwidth ranging object which specifies a minimum desired bandwidth and an interval that specifies an amount by which bandwidth may be trimmed in accordance with an embodiment.

Information relating to a minimum desired bandwidth and an interval may be stored in an object that may be included in an RSVP message such that a variable bit-rate codec may be supported. For example, within a RSVP PATH or RESV message, values may be arranged to represent traffic and requested quality of service parameters that enable service of a desired quality to be established for a particular traffic flow. FIG. 2A is a diagrammatic representation of a bandwidth ranging object which specifies a minimum desired bandwidth and an interval that specifies an amount by which bandwidth may be trimmed in accordance with an embodiment. A bandwidth ranging object 212 may specify a minimum desired bandwidth 204 and an interval 208.

It should be appreciated that bandwidth ranging object 212 may generally include additional information 210. Additional information 210 may include, but is not limited to including, information that allows bandwidth ranging object 208 to be substantially paired to a specific TSPEC with which additional information 210 is associated.

Figure 2B:
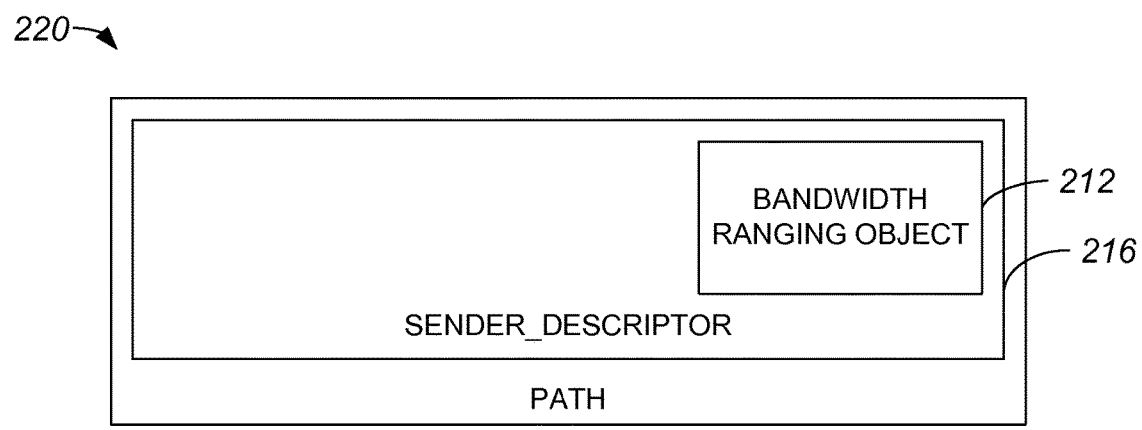
FIG. 2B is a diagrammatic representation of a PATH message that includes a bandwidth ranging object, e.g., bandwidth ranging object 212 of FIG. 2A, in accordance with an embodiment.

Bandwidth ranging object 212 may be included in RSVP messages, as for example RSVP PATH and RESV messages, such that the RSVP messages may effectively specify minimum desired bandwidth 205 and interval 208. With reference to FIG. 2B, a PATH message that includes a bandwidth ranging object, e.g., bandwidth ranging object 212 of FIG. 2A, will be described in accordance with an embodiment. A PATH message 220 may generally include a sender_descriptor object 216. Sender_descriptor 216 typically includes at least a sender_template (not shown) and a sender_TSPEC (not shown). In the described embodiment, sender_descriptor 216 also includes bandwidth ranging object 212.

Figure 2C:
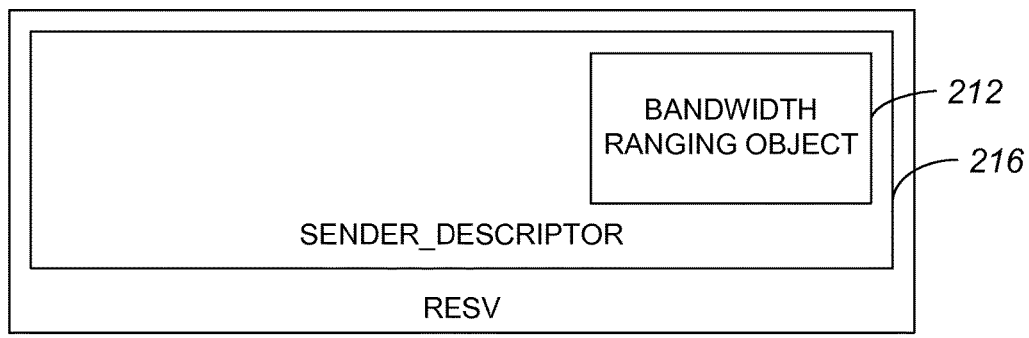
FIG. 2C is a diagrammatic representation of a RESV message that includes a bandwidth ranging object, e.g., bandwidth ranging object 212 of FIG. 2A, in accordance with an embodiment.

FIG. 2C is a diagrammatic representation of a RESV message that includes a bandwidth ranging object, e.g., bandwidth ranging object 212 of FIG. 2A, in accordance with an embodiment. A RESV message 224 may include sender_descriptor 216. As discussed above, sender_descriptor 216, which may be a flowspec, typically includes at least a sender_template (not shown) and a sender_TSPEC (not shown). In the described embodiment, sender_descriptor 216 also includes bandwidth ranging object 212.

A PATH message may include a sender_TSPEC object and a RESV message may include a receiver_TSPEC object. A sender_TSPEC and a receiver_TSPEC generally specify parameters available for a traffic flow. A sender_TSPEC may, for example, effectively carry a traffic specification generated by each data source within a particular RSVP session.

In one embodiment, an object may be defined for use within a sender_TSPEC and/or a receiver_TSPEC to specify a minimum desired bandwidth at which a code may operate properly and an interval which indicates an amount by which a codec may be trimmed. For purposes of illustration, such an object may be referred to as a "rangingSPEC" object, although it should be appreciated that such an object is not limited to being referred to as a rangingSPEC object. A rangingSPEC object may be included in a sender_descriptor object and/or a FLOWSPEC object. As will be appreciated by those skilled in the art, a FLOWSPEC object may carry reservation request information generated by data receivers, and may specify requested quality of service parameters.

Figure 3A:
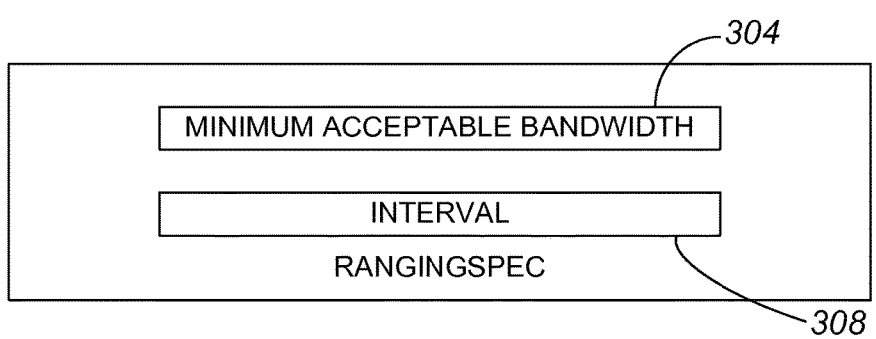
FIG. 3A is a diagrammatic representation of a rangingSPEC object which specifies a minimum desired bandwidth and an interval that specifies an amount by which bandwidth may be trimmed in accordance with an embodiment.

FIG. 3A is a diagrammatic representation of a rangingSPEC object which specifies a minimum desired bandwidth and an interval that specifies an amount by which bandwidth may be trimmed in accordance with an embodiment. A rangingSPEC object 328 specifies a minimum acceptable bandwidth 304 and an interval 308. It should be appreciated that rangingSPEC object 328 may generally also include information (not shown) that identifies a parameter identifier for rangingSPEC object 328, as well as parameters that uniquely identify the information contained in rangingSPEC object 328. In one embodiment, in the case of rangingSPEC object 328, a minimum acceptable bandwidth and an interval are associated within a TSPEC whether in a sender_descriptor or in a flowspec.

Figure 3B:
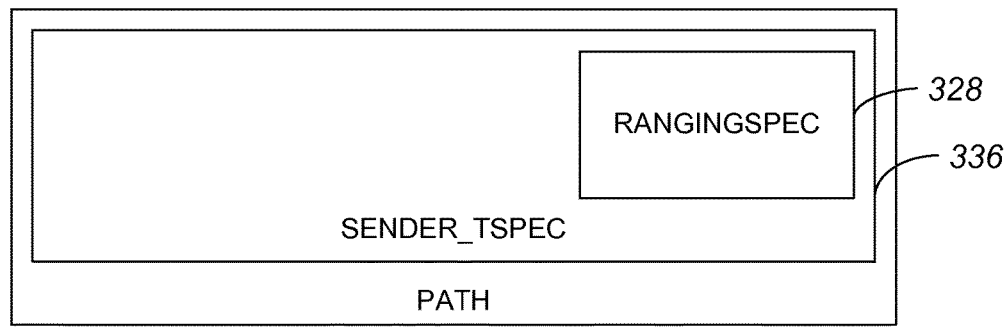
FIG. 3B is a diagrammatic representation of a PATH message that includes a rangingSPEC object, e.g., rangingSPEC object 328 of FIG. 3A, in accordance with an embodiment.

A rangingSPEC object may be included in a PATH message and/or in a RESV message. Referring next to FIG. 3B, a PATH message that includes a rangingSPEC object, e.g., rangingSPEC object 328 of FIG. 3A, will be described in accordance with an embodiment. A PATH message 332 includes a sender_TSPEC object 336. Within sender_TSPEC object 336, rangingSPEC object 328 is included.

Figure 3C:
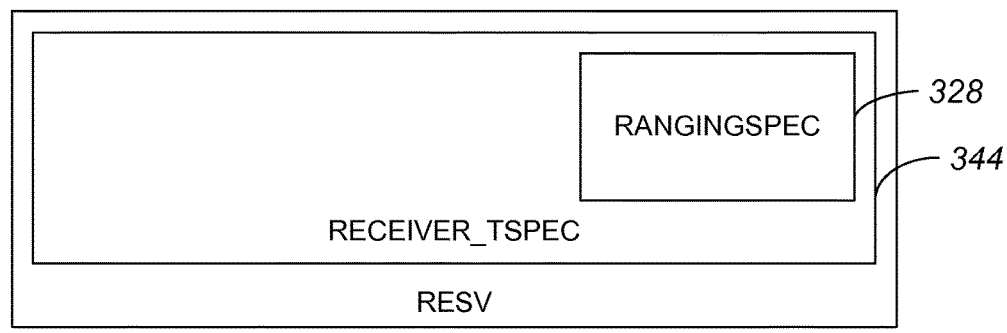
FIG. 3C is a diagrammatic representation of a RESV message that includes a rangingSPEC object, e.g., rangingSPEC object 328 of FIG. 3A, in accordance with an embodiment.

FIG. 3C is a diagrammatic representation of a RESV message that a rangingSPEC object, e.g., rangingSPEC object 328 of FIG. 3A, in accordance with an embodiment. A RESV message 332 includes sender_TSPEC object 336, and sender_TSPEC object 336 includes rangingSPEC object 328.

As will be appreciated by those skilled in the art, a MULTI_TSPEC object is typically arranged to specify multiple TSPECs. In one embodiment, a MULTI_TSPEC object may be arranged to specify an upper bandwidth bound and a lower bandwidth bound. That is, a MULTI_TSPEC object may effectively provide an indication of a range of bandwidths that a may be utilized by an application. At least two TSPECS, e.g., a primary TSPEC and a TSPEC specified in a MULTI_TSPEC object, may be used to substantially establish a bandwidth range as an upper bound and a lower bound, and a network may select substantially any bandwidth within the bandwidth range, e.g., routers along a path may select substantially any bandwidth within the bandwidth range. The primary TSPEC may be a TSPEC that is already in existence. In another embodiment, a MULTI_TSPEC object may include both a TSPEC that is an upper bandwidth bound TSPEC and another TSPEC that is a lower bandwidth bound TSPEC.

Figure 4A:
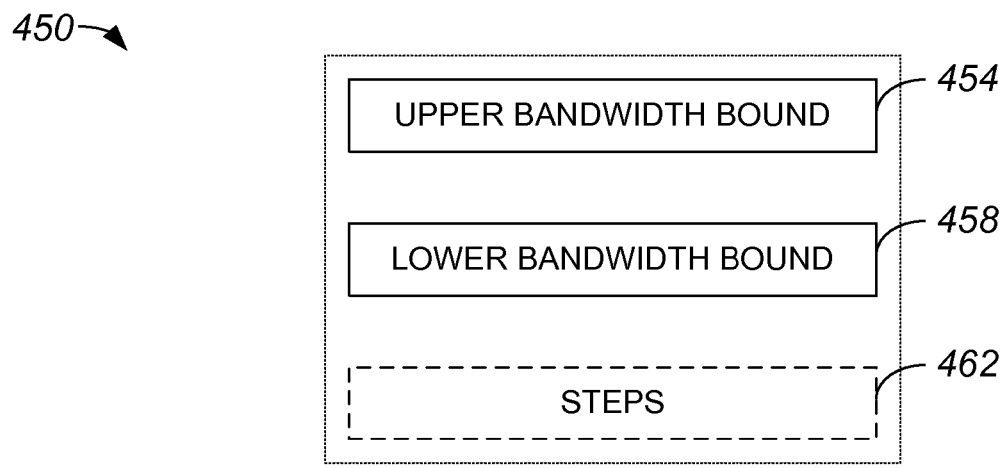
FIG. 4A is a diagrammatic representation of a MULTI_TSPEC object that specifies an upper bandwidth bound or limit and a lower bandwidth bound or limit in accordance with an embodiment.

FIG. 4A is a diagrammatic representation of a MULTI_TSPEC object that specifies an upper bandwidth bound or limit and a lower bandwidth bound or limit in accordance with an embodiment. A MULTI_TSPEC object 450 includes at least an upper bandwidth bound TSPEC 454 and a lower bandwidth bound TSPEC 458 which specify a substantially maximum amount of bandwidth desired by an application and a substantially minimum amount of bandwidth desired by the application, respectively. MULTI_TSPEC object 450 optionally specifies steps 462 that indicate bandwidth increments by which an upper bandwidth bound may be decremented and/or a lower bandwidth bound may be incremented.

By way of example, for an upper bandwidth bound of approximately 5000 units and a lower bandwidth bound of approximately 1000 units, steps 462 may indicate an increment of approximately 100 units. Thus, a network may allocate substantially any available bandwidth between approximately 1000 units and approximately 5000 units, in increments of approximately 100 units. Hence, when a network has approximately 1500 available bandwidth units, the network may allocate the approximately 1500 available bandwidth units. In general, a network may effectively allocate a substantially maximum available bandwidth in a single negotiation.

Figure 4B:
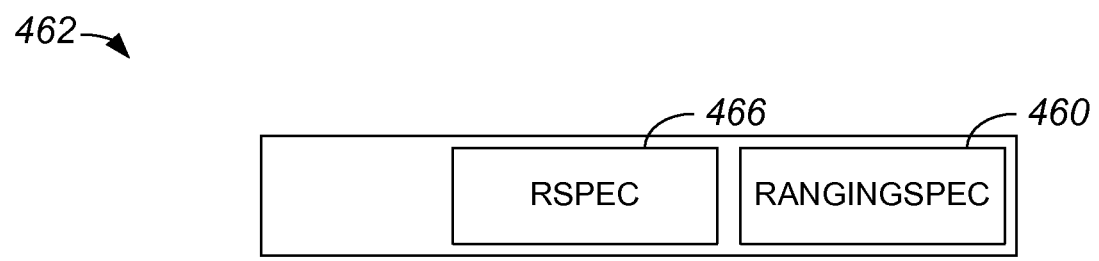
FIG. 4B is a diagrammatic representation of a MULTI_TSPEC ID in accordance with an embodiment.

In one embodiment, one bandwidth bound, e.g., an upper bandwidth bound, may be specified in an existing TSPEC, while another bandwidth bound, e.g., a lower bandwidth bound, may be specified in an object such as a rangingSPEC object that is included in a MULTI_TSPEC object. In addition to specifying a bandwidth bound, a rangingSPEC object included in a MULTI_TSPEC object may also specify steps or an increment. A rangingSPEC object may be included in a MULTI_TSPEC ID of a MULTI_TSPEC object. FIG. 4B is a diagrammatic representation of a MULTI_TSPEC ID in accordance with an embodiment. Within a MULTI_TSPEC ID 462, a rangingSPEC 460 may be included substantially after an RSPEC 466 that describes a level of service.

Figure 5:
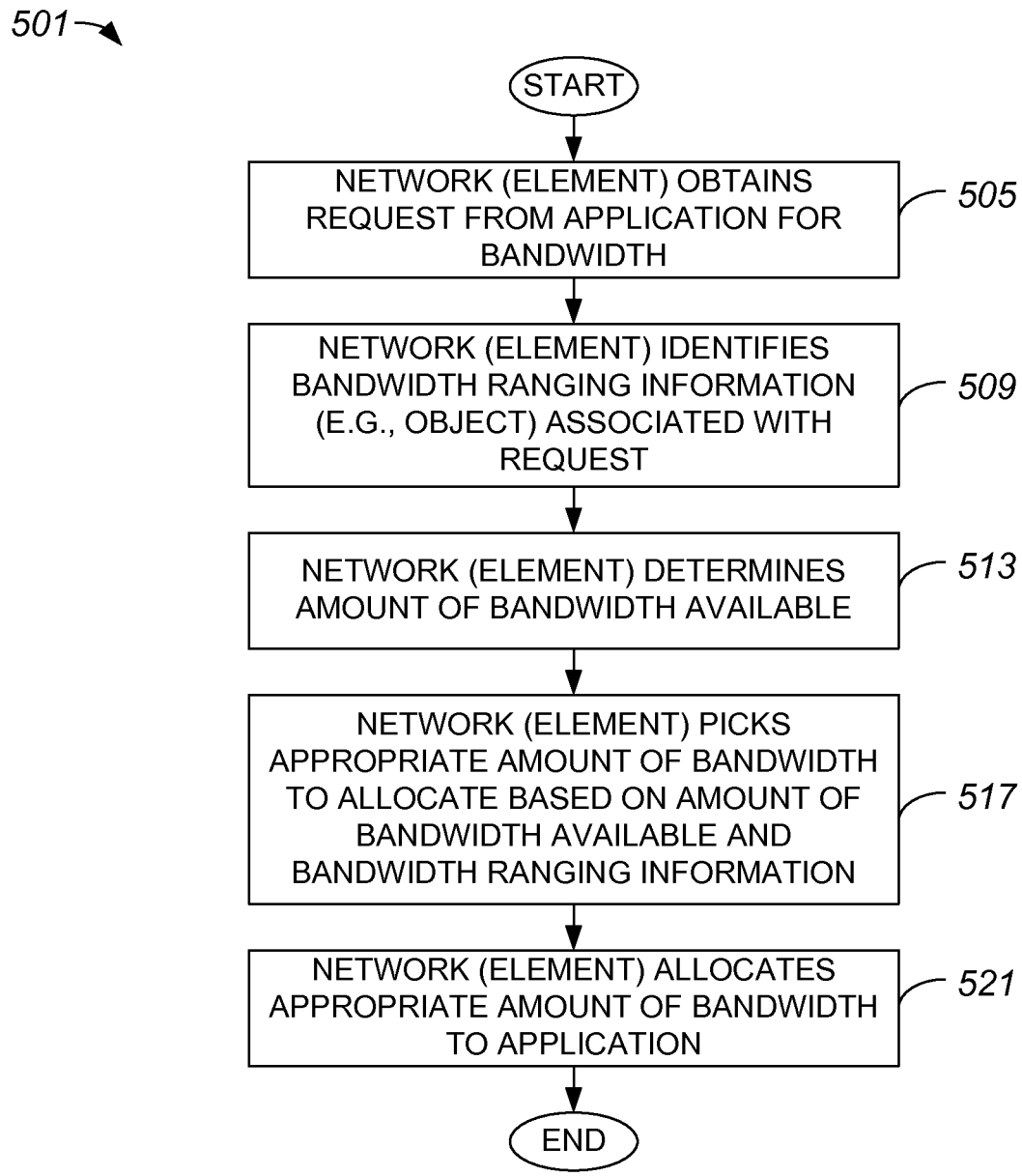
FIG. 5 is a process flow diagram which illustrates one method of allocating bandwidth in a system that supports variable bit-rate reservations in accordance with an embodiment.

Referring next to FIG. 5, one method of allocating bandwidth in a system that supports variable bit-rate reservations will be described in accordance with an embodiment. A process 501 of allocating bandwidth begins at step 505 in which a network, e.g., a node or element within a network, obtains a request from an application for bandwidth. The request may be associated with, but is not limited to being associated with, a PATH message or a RESV message.

The network, upon obtaining the request for bandwidth, identifies bandwidth ranging information associated with the request in step 509. As discussed above, the bandwidth ranging information may be included in a PATH message or a RESV message. Once the bandwidth ranging information, which may include at least a minimum desired bandwidth specified by an application, is identified, the network determines an amount of bandwidth available within the network in step 513.

After the network determines an amount of bandwidth available in the network, the network picks an appropriate amount of bandwidth to allocate to the application in step 517. In one embodiment, the appropriate amount of bandwidth to allocate may be determined based on factors including, but not limited to including, the amount of bandwidth available in the network and the bandwidth ranging information. For example, if an amount of bandwidth available in the network is substantially equal to a minimum amount of bandwidth desired by an application, the network may determined that the appropriate amount of bandwidth to allocate is the minimum amount of bandwidth desired by the application. It should be appreciated that if an amount of bandwidth available within the network is less than a substantially optimal amount, e.g., a desired maximum amount, bandwidth ranging information such as an interval or increment may be used to determine an appropriate amount of bandwidth to allocate.

In step 521, the network allocates an appropriate amount of bandwidth to the application. That is, the network effectively reserves the appropriate amount of bandwidth for use by the application. Typically, the amount of bandwidth allocated to the application is in a range between a substantially optimal amount of bandwidth desired by the application and a minimum amount of bandwidth desired by, or acceptable to, the application. Upon the network allocating an appropriate amount of bandwidth to the application, the process of allocating bandwidth is completed.

Figure 6A:
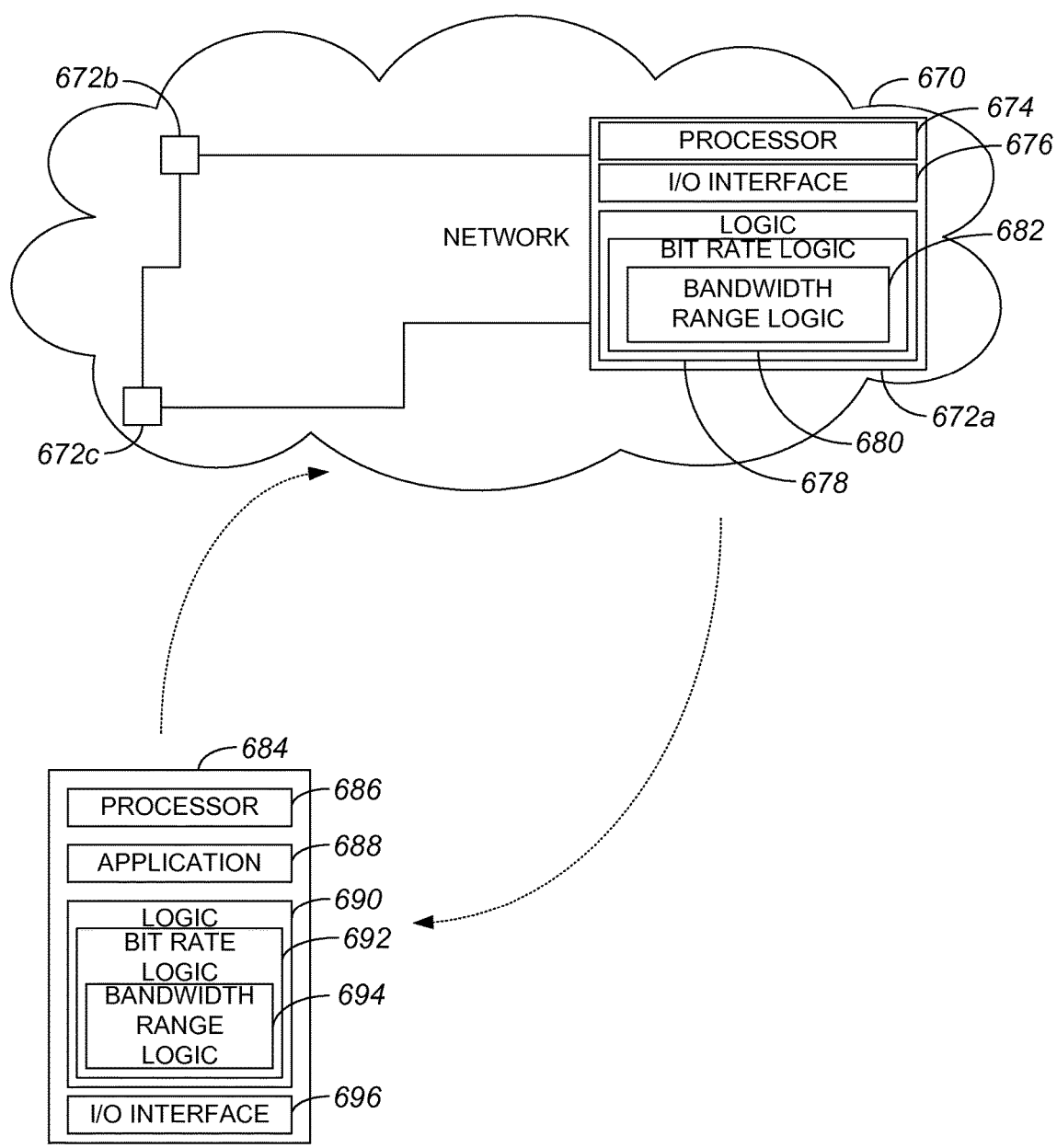
FIG. 6A is a diagrammatic representation of an overall arrangement that supports variable bit-rate reservations in accordance with an embodiment.

FIG. 6A is a diagrammatic representation of an overall arrangement that supports variable bit-rate reservations in accordance with an embodiment. An overall arrangement includes a network 670 that includes any number of network elements 672a-c, or nodes. A node 684 is arranged to communicate with network 670 or, more specifically, network elements 672a-c within network 670. It should be appreciated that although node 684 is shown as being substantially external to network 670 but in communication with network 670, node 684 may instead be included in network 670.

Network elements 672a-c are all generally configured to communicate with each other within network 670. It should be appreciated that network elements 672a-c may be any suitable elements arranged to operate within network 670. By way of example, network elements 672a-c may be, but are not limited to being, routers, switches, and/or access points. As shown, a network element 672a may generally include a processor 674, an input/output (I/O) interface 676, and logic 678. I/O interface 676 may include at least one port that may obtain information, e.g., data packets, and/or transmit through network 670. Logic 678 may include hardware and/or software logic, and processor 674 may generally execute software logic.

Logic 678 may include bit-rate logic 680 that is generally configured to support RSVP, to determine an amount of bandwidth to allocate and, further, to support codecs that may operate at one of multiple different bit-rates. Bandwidth range logic 682, which is included in bit-rate logic 682, is configured to obtain bandwidth range information, e.g., through a message obtained from an application such as application 688 associated with node 684, that includes a bandwidth ranging object, and to process bandwidth range information to determine an amount of bandwidth to allocate to the application. Bandwidth range logic 682 is generally configured to ascertain an amount of available bandwidth that may be supported within network 670, e.g., by network element 672a, and to determine how much bandwidth to allocate to an application based on the available bandwidth and information specified in bandwidth range information provided by the application.

Node 684, which may be any element or device that may communicate with network 670, includes a processor 686, an I/O interface 696, application 668, and logic 690. Application 668 may generally be any suitable application that utilizes reserved bandwidth, and has associated codecs. Suitable applications may include, but are not limited to including, video applications such as telepresence applications. Logic 690 may include hardware and/or software logic, and generally includes bit-rate logic 692 is configured to support RSVP. Bit-rate logic 692 is also configured to support codecs that may operate at one of multiple different bit-rates. Bandwidth range logic 694, which is included in bit-rate logic 692, is configured to identify bandwidth range information, and to provide bandwidth range information to network 670, as for example in a bandwidth ranging object. In general, bandwidth range logic 694 may create and transmit a bandwidth ranging object through I/O interface 696.

Figure 6B:
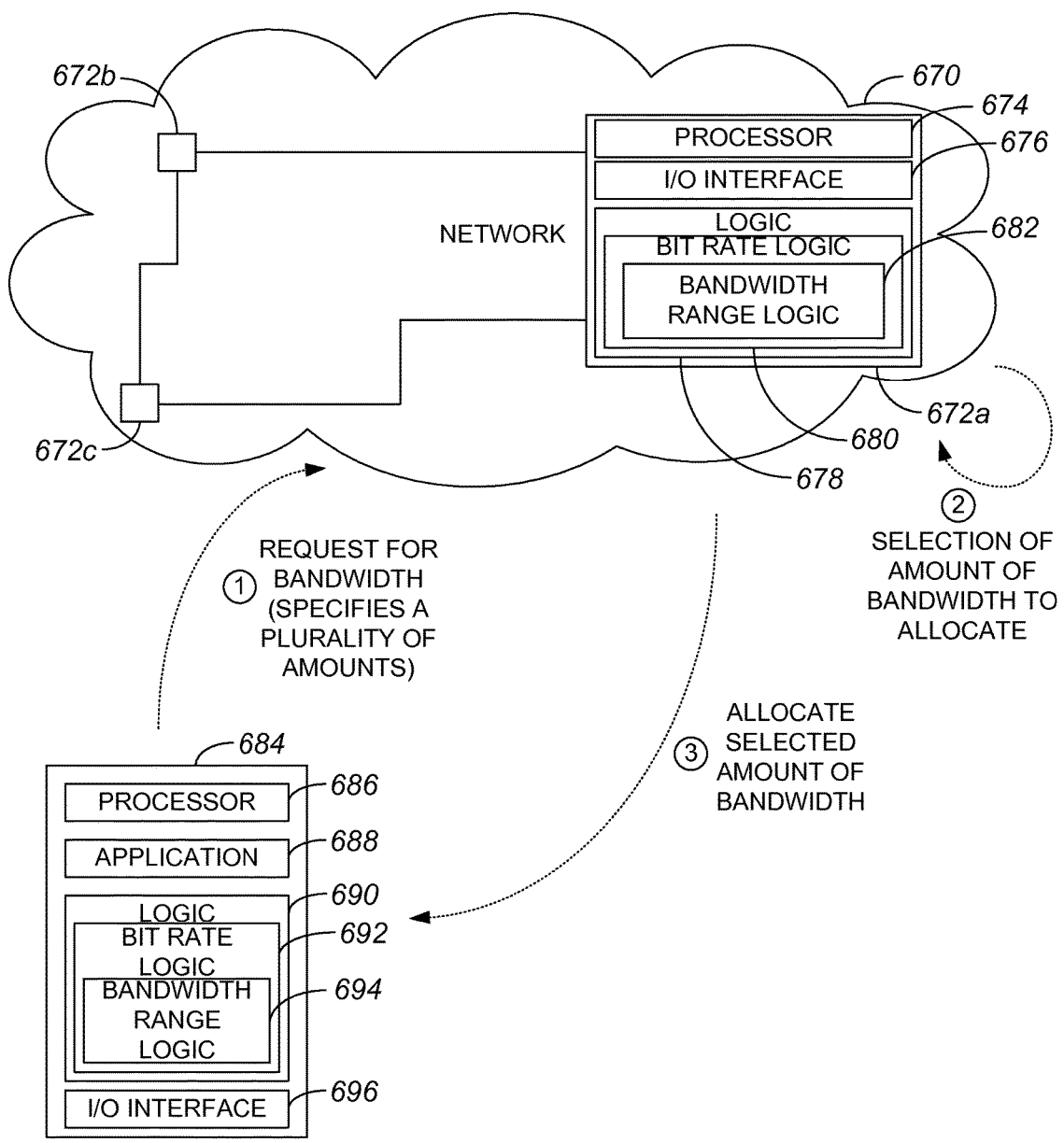
FIG. 6B is a diagrammatic representation of a process of obtaining a bandwidth allocation as a result of a request for bandwidth in accordance with an embodiment.

With reference to FIG. 6B, a process of a network, e.g., network 670 of FIG. 6A, obtaining a bandwidth allocation as a result of a request for bandwidth from an application associated with a node, e.g., application 688 of node 684, will be described in accordance with an embodiment. At a time t1, node 684 provides a request for bandwidth that effectively specifies a plurality of bandwidth amounts acceptable to application 688. The plurality of bandwidth amounts may be specified, in one embodiment, as a minimum desired bandwidth, or a lower bandwidth bound, and an interval such that the interval may be used in a determination of acceptable amounts of bandwidth. In another embodiment, the plurality of bandwidth amounts may be specified to include at least an upper bandwidth bound and a lower bandwidth bound.

At a time t2, upon receiving or otherwise obtaining a request for bandwidth, network 670, as for example through the use of network element 672a, may select an amount of bandwidth to allocate to application 688 in response to the request. As previously discussed, the amount of bandwidth allocated may be determined based upon the amount of bandwidth available within network 670 and bandwidth information provided by application 688. A selected amount of bandwidth is allocated by network 670 to application 688 at a time t3.

Although only a few embodiments of the present invention have been described, it should be understood that the present invention may be embodied in many other specific forms without departing from the spirit or the scope of the present disclosure. By way of example, a network element has been described as determining an appropriate amount of bandwidth to allocate. In the event that one network element in a path has the capacity to allocate more bandwidth than another network element in the path, the overall network may determine that an appropriate amount of bandwidth to allocate is an amount that may be supported by substantially all network elements in the path. That is, an amount of bandwidth that is allocated in response to a request from an application is dependent upon the amount of bandwidth available within an overall network.

A bandwidth ranging object may generally not specify a greater amount of bandwidth, e.g., an upper bandwidth bound, than is specified by a primary TSPEC. It should be appreciated, however, that if a bandwidth ranging object specifies an amount of bandwidth that is greater than the amount specified in a primary TSPEC, the bandwidth ranging object may effectively be ignored. In general, any objects that are not understood by a system may essentially be ignored.

More than two TSPEC object may exist within a PATH message or within an RESV message, e.g., a set of TSPEC objects may include more than two TSPEC objects. In one embodiment, when there is a set of TSPEC objects associated with a message, a first TSPEC object of such a set may specify a higher bandwidth bound and a last TSPEC object of the set may specify a lower bandwidth bound. Thus, more than two TSPECS may be present, and such TSPEC objects may be used for purposes other than, or in addition to, specifying bandwidth bounds.

While multiple bandwidths have been described as being specified in a RESV message through the use of TSPECs or TSPEC objects, the bandwidths are not limited to being specified using TSPECs or TSPEC objects. Multiple bandwidths may generally be specified using any suitable method.

In one embodiment, if none of the bandwidths specified in a RESV message may be supported, no bandwidth may be allocated in response to the RESV message. It should be appreciated, however, that some bandwidth may instead be allocated even if none of the specified bandwidths may be supported. For example, if a RESV message specifies a lowest desired bandwidth, if the lowest desired bandwidth may not be accommodated, rather than allocating substantially no bandwidth in response to the RESV message, an amount of bandwidth that is less than the lowest desired bandwidth may be allocated in some instances.

It should be appreciated that when an application secures a bandwidth reservation that is less than a substantially maximum desired amount, e.g., a desired upper bandwidth bound, packets marked at a relatively low priority within a class may be dropped. For instance, if an application marks its packets at a highest level and/or a lowest drop priority for a class for approximately an entire amount of a reservation, although the application may still elect to send additional traffic marked at lower levels, the traffic marked at lower levels may be dropped.

In general, although the embodiments have been described in the context of RSVP, it should be appreciated that the embodiments may be applied to other deterministic reservation protocols. Other suitable reservation protocols may include, but are not limited to including, a Next Steps in Signaling (NSIS) protocol and a Network Layer Signaling (NLS) protocol.

It should be appreciated that while the embodiments generally refer to the use of VBRs, any suitable application may generally reserve bandwidth in some range in particular increments. Such suitable applications may generally include, but are not limited to including, media flow such as codecs, electronic whiteboards, and/or application sharing, That is, bandwidth may be reserved in a particular range in particular increments with respect to any suitable construct.

The embodiments may be implemented as hardware and/or software logic embodied in a tangible medium that, when executed, e.g., by a processing system associated with a host device and/or a headset, is operable to perform the various methods and processes described above. That is, the logic may be embodied as physical arrangements, modules, or components. A tangible medium may be substantially any suitable physical, computer-readable medium that is capable of storing logic which may be executed, e.g., by a processing system such as a computer system, to perform methods and functions associated with the embodiments. Such computer-readable media may include, but are not limited to including, physical storage and/or memory devices. Executable logic may include code devices, computer program code, and/or executable computer commands or instructions that may be embodied on computer-readable media.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present invention may vary widely. Steps may be added, removed, altered, combined, and reordered without departing from the spirit of the scope of the present disclosure. Therefore, the present examples are to be considered as illustrative and not restrictive, and the invention is not to be limited to the details given herein, but may be modified within the scope of the appended claims.

What is claimed is:

1. A method comprising:
   obtaining a first message from an application, the application being associated with a variable bit-rate media flow, the first message including information, the information including at least an approximately minimum bandwidth at which the variable bit-rate media flow may operate and an increment by which a bandwidth of the variable bit-rate media flow may be trimmed;
   determining an amount of available bandwidth in a network;
   identifying, from the first message, the approximately minimum bandwidth at which the variable bit-rate media flow may operate and the increment by which the bandwidth of the variable bit-rate media flow may be trimmed; and
   identifying a bandwidth allocation, the bandwidth allocation being identified based on the amount of available bandwidth in the network, the approximately minimum bandwidth at which the variable bit-rate media flow may operate, and the increment by which the bandwidth of the variable bit-rate media flow may be trimmed.

2. The method of claim 1 wherein the information is embodied in a bandwidth ranging object associated with the first message.

3. The method of claim 2 wherein the first message is a resource reservation protocol (RSVP) PATH message, and the bandwidth ranging object is used within a Sender_Descriptor of the PATH message.

4. The method of claim 2 wherein the first message is a resource reservation protocol (RSVP) RESV message, and the bandwidth ranging object is used in a FLOWSPEC of the RESV message.

5. The method of claim 1 wherein the first message is a resource reservation protocol (RSVP) PATH message, and the information is included in a SENDER_TSPEC.

6. The method of claim 1 wherein the first message is a resource reservation protocol (RSVP) RESV message, and the information is included in a RECEIVER_TSPEC.

7. The method of claim 1 wherein the approximately minimum bandwidth is a lower bandwidth bound, and wherein the information further includes an upper bandwidth bound, the upper bandwidth bound being specified in a first TSPEC object and the lower bandwidth bound being specified in a second TSPEC object.

8. The method of claim 7 wherein the first TSPEC object is a first TSPEC object of more than two TSPEC objects and the second TSPEC object is a last TSPEC object of the more than two TSPEC objects.

9. The method of claim 1 further including allocating the bandwidth allocation to the application.

10. The method of claim 1 wherein the variable bit-rate media flow has a desired bandwidth, and wherein the amount by which the bandwidth of the variable bit-rate media flow may be trimmed is the amount by which the desired bandwidth of the variable bit-rate media flow may be trimmed.

11. The method of claim 1 wherein the variable bit-rate media flow is a variable bit-rate codec.

12. A non-transitory computer-readable medium with computer instructions for execution and when executed operable to:
   obtain a first message from an application, the application being associated with a variable bit-rate media flow, the first message including information, the information including at least an approximately minimum bandwidth at which the variable bit-rate media flow may operate and an increment by which a bandwidth of the variable bit-rate media flow may be trimmed;
   determine an amount of available bandwidth in a network;
   identify, from the first message, the approximately minimum bandwidth at which the variable bit-rate media flow may operate and the increment by which the bandwidth of the variable bit-rate media flow may be trimmed; and
   identify a bandwidth allocation, the bandwidth allocation being identified based on the amount of available bandwidth in the network, the approximately minimum bandwidth at which the variable bit-rate media flow may operate, and the increment by which the bandwidth of the variable bit-rate media flow may be trimmed.

13. The non-transitory computer-readable medium of claim 12 wherein the information is embodied in a bandwidth ranging object associated with the first message.

14. The non-transitory computer-readable medium of claim 13 wherein the first message is a resource reservation protocol (RSVP) PATH message, and the bandwidth ranging object is used within a Sender_Descriptor of the PATH message.

15. The non-transitory computer-readable medium of claim 13 wherein the first message is a resource reservation protocol (RSVP) RESV message, and the bandwidth ranging object is used in a FLOWSPEC of the RESV message.

16. The non-transitory computer-readable medium of claim 12 wherein the first message is a resource reservation protocol (RSVP) PATH message, and the information is included in a SENDER_TSPEC.

17. The non-transitory computer-readable medium of claim 12 wherein the first message is a resource reservation protocol (RSVP) RESV message, and the information is included in a RECEIVER_TSPEC.

18. The non-transitory computer-readable medium of claim 12 wherein the approximately minimum bandwidth is a lower bandwidth bound, and wherein the information further includes an upper bandwidth bound, the upper bandwidth bound being specified in a first TSPEC object and the lower bandwidth bound being specified in a second TSPEC object.

19. The non-transitory computer-readable medium of claim 12 further operable to allocate the bandwidth allocation to the application.

20. The non-transitory computer-readable medium of claim 12 wherein the variable bit-rate media flow has a desired bandwidth, and wherein the amount by which the bandwidth of the variable bit-rate media flow may be trimmed is the amount by which the desired bandwidth of the variable bit-rate media flow may be trimmed.

21. A method comprising:
obtaining a first message from an application, the application being associated with a construct, the first message including information, the information including at least an approximately minimum bandwidth at which the construct may operate;
determining an amount of available bandwidth in a network;
identifying, from the first message, the approximately minimum bandwidth at which the construct may operate;
identifying an increment by which a desired bandwidth of the construct may be trimmed; and
identifying a bandwidth allocation, the bandwidth allocation being identified based on the amount of available bandwidth in the network, the approximately minimum bandwidth at which the construct may operate, and an increment by which the desired bandwidth of the construct may be trimmed.

22. A method comprising:
obtaining a first message from an application, the application being associated with a variable bit-rate media flow, the first message including information, the information including a minimum bandwidth desired by the application, a maximum bandwidth desired by the application, and an increment by which a bandwidth of the variable bit-rate media flow may be augmented;
determining an amount of available bandwidth in a network;
identifying, from the first message, the minimum bandwidth desired by the application, the maximum bandwidth desired by the application, and the increment by which the bandwidth of the variable bit-rate media flow may be trimmed may be augmented;
determining if the amount of available bandwidth in the network is less than the maximum bandwidth desired by the application;
if it is determined that the amount of the available bandwidth in the network is equal to or more than the maximum bandwidth desired by the application, allocating the maximum bandwidth desired by the application to the application; and
if it is determined that the amount of the available bandwidth in the network is not equal to or more than the maximum bandwidth desired by the application, determining how much of the available bandwidth to allocate to the application, wherein determining how much or the available bandwidth to allocate to the application includes determining if a first amount that is equal to the maximum bandwidth desired by the application decremented by the increment by which the bandwidth of the variable bit-rate media flow may be augmented is less than the amount of the available bandwidth.

* * * * *